United States Patent

McKinstry

[15] 3,650,247
[45] Mar. 21, 1972

[54] AUTOMATIC WATERER

[72] Inventor: James E. McKinstry, Cedar Rapids, Iowa

[73] Assignee: Nelson Manufacturing Company, Cedar Rapids, Iowa

[22] Filed: May 14, 1970

[21] Appl. No.: 37,137

[52] U.S. Cl. ............................................................119/81
[51] Int. Cl. ......................................................A01k 07/00
[58] Field of Search ...............119/81, 73; 137/408, 400, 402

[56] References Cited

UNITED STATES PATENTS

| | | | |
|---|---|---|---|
| 386,752 | 7/1888 | Medbury | 119/81 |
| 153,000 | 7/1874 | Kelly | 137/408 |
| 2,817,355 | 12/1957 | Goff | 119/81 X |
| 3,324,834 | 6/1967 | McKinstry | 119/81 X |

Primary Examiner—Hugh R. Chamblee
Attorney—Hill, Sherman, Meroni, Gross & Simpson

[57] ABSTRACT

An automatic waterer which utilizes a self closing valve which is vertically installed and in which spring and hydraulic pressure work to seat the valve and in which a pivoted beam which utilizes a weight of substantial mass at one end and which carries a drinking bowl on the other end is provided. As animals drink from the bowl the mass overcomes the weight of the liquid in the bowl and lowers the beam on the valve actuator so as to replenish the liquid supply in the bowl thus rebalancing the beam and allowing the valve actuator to return to the closed position.

6 Claims, 5 Drawing Figures

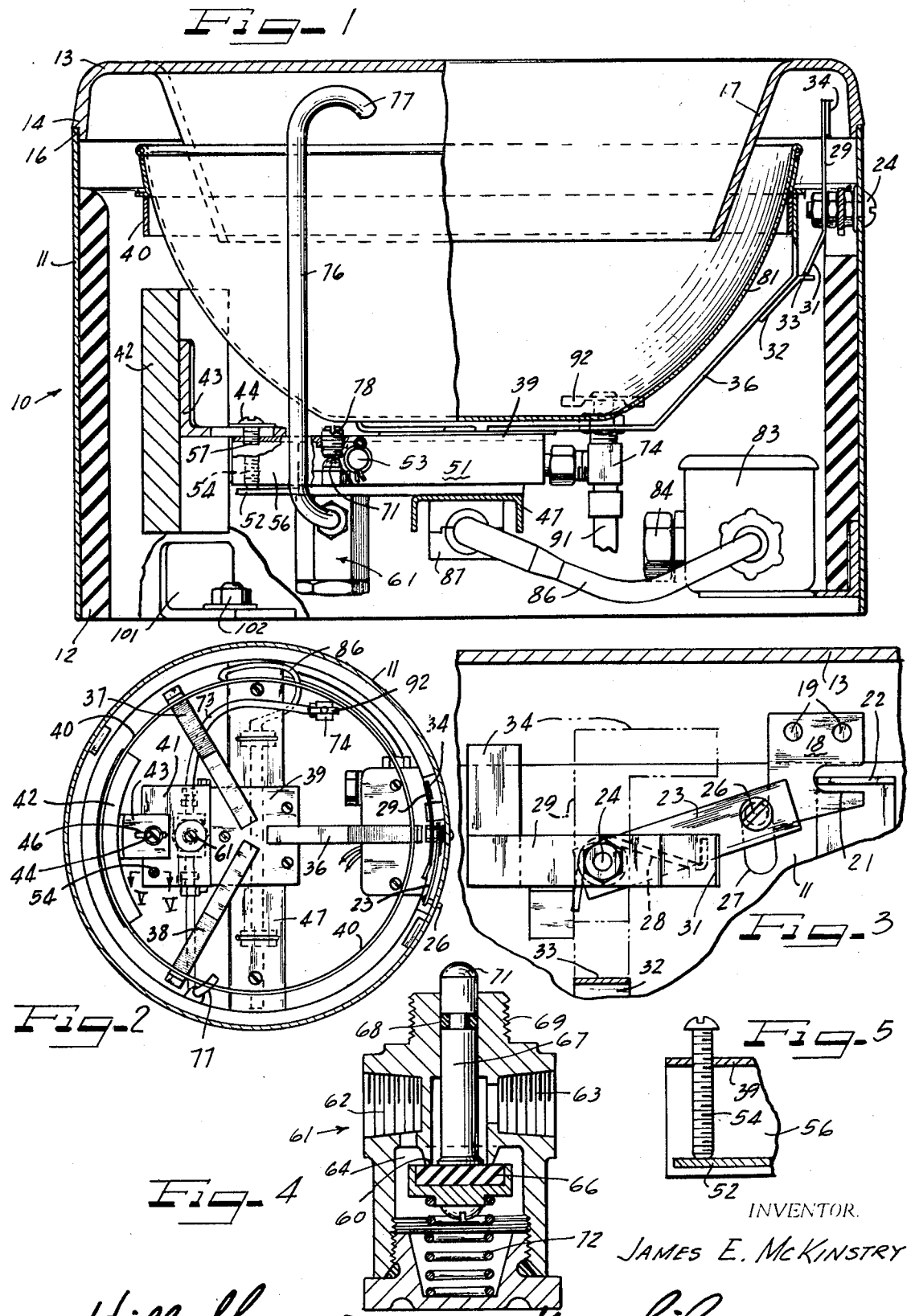

3,650,247

AUTOMATIC WATERER

BACKGROUND OF THE INVENTION

1. Field of the Invention

This invention relates in general to waterers for animals and in particular to a waterer with positive control which is safe and quiet and dependable and may easily be sterilized.

2. Description of the Prior Art

There have been numerous waterers for animals in the prior art. Certain ones utilize floating type bowls such as disclosed in the U.S. Pat. to Nelson No. 2,664,070 and McKinstry No. 3,324,834. These systems utilize the buoyance of a drinking bowl to open and close a valve as liquid is removed from the bowl.

Other waterers have utilized the weight of the water, external springs or floats to shut off a valve but these devices have proved to be susceptible to variations of water pressure both in the opening and closing of the valve. In such devices hydraulic shock in the water supply can cause the valves to leak and this oftentimes happens with long water supply lines which are connected to devices remote from the water source. Small and large animals are often temporarily or permanently housed in confined quarters inside buildings and presently available watering devices are not reliable, are noisy in operations, difficult to clean, not easily shut off and are difficult to control the level of water in the drinking trough. Many animals in confined quarters such as horses are highly nervous and it is desirable to have an automatic watering device that does not startle them when the valve operates. Float control valves and others that modulate tend to be noisy in operation. Because of their design it is difficult to control the stream of water discharging from the valves and therefor impossible to eliminate the splash noise that results. This causes the nervous animals to be excited and upset which is undesirable.

Under todays livestock raising conditions owners as well as research scientists desire that sanitary watering devices which can be easily and thoroughly cleaned and in some cases sterilized be available. Commercially available waterers are constructed so that it is difficult if not impossible to thoroughly clean them and impossible to sterilize them. These devices are made with castings, welds, crevices, floats, valves, heaters, mud guards, corks or stoppers, pipe threads and the like which have portions where bacteria can breed and thereby transmit disease from one animal user to another. This is very undesirable feature of presently available watering devices.

SUMMARY OF THE INVENTION

The present invention comprises an automatic waterer which operates very quietly, has very positive control of the liquid level and may be easily cleaned or sterilized. At times when the water should not be available to the animals for reasons of health or research the present invention allows the water to be quickly and easily shut off. For example if medication is to be given to the animal it may be placed in the waterer of the invention with the input water shut off, so that the water may be totally consumed by the animal.

The present invention utilizes a self closing valve which is installed vertically and in which both spring and hydraulic pressure operate to seat the valve making it much more reliable than valves previously used. High pressure in the water line will not cause the valve to leak and it is unaffected by hydraulic shock. Although the valve could be operated in any position about the pivotal axis with the valve actuator up, down or horizontal the preferred embodiment utilizes the valve actuator in the up position so that any foreign matter entering the water will have the least chance of interfering with the valve operations when "on", the valve will be uniform.

A pivoted beam with a weight of substantial mass is mounted in the waterer and the valve actuator is mounted so that a positive force is provided on the valve actuator to open the valve when water is removed from the drinking bowl. The weight of substantial mass is used rather than floats, springs, or the hydraulic force of the water, and this renders the present waterer much more reliable than other waterers presently available. The weight of substantial mass forces the valve open against the force of the valve spring and hydraulic pressure to a position which is adjustable thereby controlling the rate of water in flow. This allows splash noise to be minimized from the water entering the bowl and the rate of filing is independent of the rate of removal of water from the bowl. Once the valve is open, the effect of hydraulic pressure becomes negligible and a substantial positive moment about the pivot point of the beam (created by the weight) holds the valve open. Thus the undesirable modulating valve condition which creates noise and vibration and is inherent in other designs has been eliminated. The valve is closed by the force of a valve spring (independent of the hydraulic force) after the weight of the water entering the drinking bowl has balanced the balance beam system. The inertia of the rotating mass pivots the balance beam through the balance point thereby providing a smooth closing of the valve again eliminating undesired modulating of the valve and removes all external forces from the valve. The valve is held closed by hydraulic force as well as the valve spring. Since the closing of the valve is independent of the water pressure, the pan or bowl always contains the same weight of water (and therefor the same level of water) when the valve closes.

The present invention allows easy cleaning and sterilizing of the drinking bowl as well as having a smooth and easy to clean external construction which minimizes the accumulation of contaminants.

A protective top cover may be removed and a manual lock is provided to lock the valve in a closed position. This lock may also be automatic if desired on removal of the cover.

The drinking bowl can then be lifted from the waterer, emptied, cleaned and sterilized. The present invention allows the waterer to be quickly and easily cleaned and sterilized and the bowl may be made from a smooth material which allows easy cleaning and sterilization. Conventional prior art drinking devices are generally constructed of rough castings and are difficult or impossible to clean or sterilize. Also floats, immersion heaters and the like prevent removal of the drinking trough as in the present design.

The supply valve may be locked with the drinking bowl empty but in place or locked closed with the bowl containing water, as for example when medication is to be supplied to an animal and the animal is to consume all of the water.

Other objects features and advantages of the invention will be readily apparent from the following description of certain preferred embodiments thereof taken in conjunction with the accompanying drawings, although variations and modifications may be effected without departing from the spirit and scope of the novel concepts of the disclosure, and in which

BRIEF DESCRIPTION OF THE DRAWINGS

FIG. 1 is a sectional view of the automatic waterer of this invention;

FIG. 2 is a top view of the automatic waterer of this invention with the drinking bowl removed;

FIG. 3 is a partial cut away sectional view illustrating the valve locking device of this invention;

FIG. 4 is a sectional view to the valve and valve actuator, and

FIG. 5 is a detail sectional view of the beam adjusting screw of the invention.

DESCRIPTION OF THE PREFERRED EMBODIMENTS

FIGS. 1 and 2 illustrate generally cylindrical housing 11 that might be made of stainless steel or other material which is easily cleaned and which is insulated by a suitable cylindrical insulator 12 attached to its inner surface. A cover 13 which might be of rust proof cast aluminum is attached to the housing 11 by cam locks and a latch and has a mating portion 14 that mates with the upper edge 16 of the housing 11. A downwardly extending portion of the cover 17 extends over the upper edge of the drinking bowl 81. As best shown in FIG. 3 the cover 13 is detachably connected to the housing 11 by a cam plate 18 which is attached to the cover 13 by suitable holding means 19 and which is formed with a housing 11 as the cover is rotated. A latch 23 is pivotally connected to the housing by pivot pin 24 and is spring biased by a spring 28 upwardly relative to FIG. 3. A latch release pin 26 extends through a slot 27 in the housing 11 and may be depressed to allow the cover 13 to be rotated so that the slot 21 moves out of engagement with the member 22. It is to be realized that there are a pair of cams 18 on opposite sides of the cover 13 and corresponding members 22 which the slots 21 engage. Only a single one of the cams 18 is illustrated since the other one is the same. Only a single latch 23 is required to lock the cover to the housing.

It is to be particularly noted that the latch pin 26 extends only a short distance from the housing 11 and although it may be easily actuated by a person it may not be actuated by an animal accidentally.

A support frame structure 47 extends across the housing 11 and has a support plate 52 which is formed into a channel with opposite upwardly extending sides 56 as shown in section in FIG. 1. A balance beam structure comprises a channel member 39 which has downwardly extending sides 51 and which is pivotally supported by the channel 52 by a pivot pin 53 so that the beam 39 may pivot about the pin 53. A bowl supporting structure comprising three radially extending members 36, 36 and 38 are attached to the beam 39 and carry a ring 40 at their upper ends into which the bowl 81 is received. A bracket 43 is adjustably attached to one end of the balance beam 39 by an adjusting screw 44 which is received in a slot 46 that allows the bracket 43 to be adjusted relative to the beam. A weight of substantial mass 42 is connected to the bracket 43. The beam 39 has a limit adjusting screw 54 as best shown in the detailed view of FIG. 5 which has a lower end that engages the frame member 52 so as to limit the rotation of the balance beam 39 relative to the frame member 52. A valve structure 61 is attached to the frame member 52 and has an upwardly extending valve actuator 67 that has an upper end 71 that engages a valve actuating screw 78 that is threadedly mounted in the pivot beam 39 as shown in FIG. 1. The screw 78 may be adjusted vertically relative to FIG. 1 so as to adjust the throw of the valve actuator 67.

The valve 61 is attached to the frame member 52 and is shown in detail in FIG. 4. The valve has an input orifice 62 which communicates with a valve chamber 64 below the orifice 62. A valve 66 is held against a valve seat 60 by a spring 72 and has the upwardly extending valve actuator 67 which extends from the valve. A groove is formed in the valve actuator 67 and carries an O-ring seal 68. An output orifice 63 is provided in the valve 61. The upper portion of the valve 69 is threaded so that it may be threadedly attached to the frame member 52 so that the actuator portion 71 extends above the valve and may be engaged by the bolt 78 when the balance beam moves counterclockwise relative to FIG. 1.

An outlet pipe 76 is received in the outlet orifice 63 and extends upwardly and has a down portion 77 for supplying liquid to the bowl 81.

An input pipe 73 is connected to the input orifice 62 of the valve and is connected to an on-off valve 74 which has a handle 92 for turning the valve 74 off. An input water supply line 91 is connected to the valve 74.

An on-off latch 29 is pivotally supported by the pin 24 in the wall of housing 11 and has a handle 34 for moving the latch to a position such that the lower end of the latch 31 engages a projection 33 of a member 32 which is connected to the upwardly extending member 36 as shown in FIG. 1. If desired the latch 29 may be spring loaded so it moves to the locked position when the cover 13 is removed so that the valve can automatically be held in the off position when the cover 13 is removed.

An electric junction box 83 may be connected to a suitable power source and has an output lead 86 which is connected to a suitable heater 87 attached to the frame member 47 for heating the water in bowl 81 so it will not freeze. A thermostat 84 senses the temperature within the housing 11 and controls the application of power to the heater 87.

Four hold down lugs 101 are connected to the housing 11 to allow the waterer of the invention to be connected to a suitable base by holding means 102.

It is to be noted that the pivot point determined by shaft 53 is between the support point of the bowl and the valve actuator 67 so that as the bowl is emptied to allow the balance beam to tip, the actuator 67 will be depressed to open valve 66.

In operation the waterer of the invention is installed as for example by mounting it on a poured concrete base or block or by mounting it on a suitable bracket which is adapted to receive holding means 102 which extend through the brackets 101 of the waterer. The external construction of the waterer is smooth and lends itself to easy cleaning and maintenance.

The inlet water line 91 is connected to the valve 74 and the valve 74 is open by turning the handle 92. Power is connected to the junction box 83 to provide power for the heater 87.

The cover 13 is removed by depressing the latch 23 by moving the pin 26 in the slot 27 so that the pin 26 disengages the cam 18 so that the cover member 18 may be moved to the left relative to FIG. 3 so that the slot 21 disengages the member 22. The cover may then be lifted from the waterer and the bowl may be placed into the waterer. The latch 29 may be moved to hold the pivot beam 39 in the positions so that the bolt 78 does not engage the valve actuator 71 to turn the water on. The weight 42 is adjusted relative to the balance beam 39 with the set screw 44 and the movement between the balance beam 39 and the frame 52 may be adjusted by setting the screw 54 as shown in FIG. 5. The bowl 81 is placed in the ring 40 of the balance beam 39 and the latch 29 is moved to the unlocked position and the cover 13 is placed on the waterer such that the cam 18 engages the portion 22 and the latch 23 moves so that the pin 26 locks the cam 18 into engagement with the portion 22.

The weight 42 will cause the balance beam 39 to move counterclockwise relative to FIG. 1 causing the valve actuating member 67 to be depressed by the bolt 78 passing down on the end 71 of the actuator 67. This will open the valve 66 and allow water to flow from the inlet 62 into the outlet 63 of the valve and up through the supply line 76 to the discharge 77. It is to be particularly noted that the flow will be positive and that no hammering will occur. When the water in the bowl 81 has reached the desired level (which may be determined by the position of the weight 42 relative to the balance beam 39) the balance beam 39 will be pushed down by weight of the water in the bowl 81 to the position shown in FIG. 1 so that the valve actuator 67 will allow the valve 66 to seat on the seat 60 and the water will be turned off. The water will be turned off smoothly and quietly and positively with no annoying water line hammer.

The valve shut off is unaffected by fluctuations in water pressure and it always shuts off with the same weight and thus the same height of water in the drinking bowl. It is to be particularly noted that if an animal such as a horse pushes down on the drinking bowl the water will be shut off rather than making it overflow. To clean the drinking bowl the cover is removed by depressing the pin 26 and rotating the cover 13 and the latch 29 may be removed to the locked position as shown in FIG. 1 to hold the balance beam 39 in position as shown in closed. The bowl can then be removed and emptied into a bucket or outside the stall thereby eliminating mess and even the hands of the operator need not get wet. The drinking bowl may be sterilized with a solution or by autoclaving if desired. It is also to be particularly noted that in the event service becomes necessary all of the parts are accessible from the top which allows easy maintenance and service.

Although the invention has been described with respect to the shown embodiments it is not to be so limited as changes and modifications may be made therein which within the full intended scope as defined by the appended claims.

I claim as my invention:

1. An animal waterer comprising:
   a housing member;
   a balance beam pivotally supported from said housing so as to pivot about a substantially horizontal axis;
   a drinking bowl supported on said balance beam on one side of said axis of pivot;
   a weight supported on said balance beam on the other side of said axis of pivot;
   a supply valve for supplying fluid to said drinking bowl supported from said housing and having a valve actuator engageable by said beam and actuated thereby when the balance beam is moved by said weight, said valve actuator being mounted on said other side of said axis of pivot and being spring loaded to the closed position such that it is closed except when said balance beam depresses said valve actuator; and
   a cover member formed with a depression and an opening formed in said depression detachably mounted on said housing member over said drinking bowl and said drinking bowl available through the opening formed in said depression wherein cam members are attached to said cover member, cam engaging means mounted on said housing member and engageable with said cam members to join said cover member to said housing member, and latch means attached to said housing means and movable to a first position to lock said cover member to said housing member and movable to a second position to allow said cover member to be removed from said housing member.

2. A waterer according to claim 1 comprising fluid conduit means attached to said valve and having an outlet for discharging fluid into said drinking bowl.

3. A waterer according to claim 1 comprising motion limiting means mounted on said beam to limit its motion relative to said housing member.

4. A waterer according to claim 1 comprising means for adjusting the position of said weight relative to said beam to adjust the moment caused by said weight.

5. A waterer according to claim 1 comprising a heater mounted in said housing for preventing fluid in said drinking bowl from freezing.

6. An animal waterer comprising:
   a housing member;
   a balance beam pivotally supported from said housing so as to pivot about a substantially horizontal axis;
   a drinking bowl supported on said balance beam on one side of said axis of pivot;
   a weight supported on said balance beam on the other side of said axis of pivot;
   a supply valve for supplying fluid to said drinking bowl supported from said housing and having a valve actuator engageable by said beam and actuated thereby when the balance beam is moved by said weight, said valve actuator being mounted on said other side of said axis of pivot and being spring loaded to the closed position such that it is closed except when said balance beam depresses said valve actuator; and
   a cover member formed with a depression and an opening formed in said depression detachably mounted on said housing member over said drinking bowl and said drinking bowl available through the opening formed in said depression and in which a beam latch is pivotally attached to said housing member and movable to a first position to engage said beam to lock it relative to said housing member and movable to a second position so that it does not engage said beam.

* * * * *